Patented Mar. 26, 1940

2,195,122

UNITED STATES PATENT OFFICE 2,195,122

STABILIZATION OF POLYVINYL FORMAL

Birger W. Nordlander, Schenectady, N. Y., assignor to General Electric Company, a corporation of New York No Drawing. Application June 22, 1937,
Serial No. 149,668

4 Claims. (Cl. 260—73)

This invention relates broadly to an improved resinous composition. The invention is more particularly concerned with a resinous material obtained by condensing formaldehyde and a hydrolysis product of polyvinyl ester (for example, polyvinyl acetate, polyvinyl butyrate or polyvinyl propionate) and with which is incorporated certain substances of a phenolic nature that stabilize the condensation product.

The resinous material which is stabilized in accordance with the present invention may be prepared, for instance, as follows:

One hundred parts of a polymerized vinyl acetate is dissolved in 185 parts of glacial acetic acid. To this is added 83 parts of an aqueous solution of formaldehyde, containing 37½ per cent of formaldehyde, and a suitable amount of mineral acid, for example 6.8 parts of concentrated sulfuric acid. All proportions herein given are by weight. Hydrolysis is carried out at about 70° C. in an enameled vessel. Samples of the reaction mixture are removed at suitable intervals of time and analyzed for their formaldehyde content. The results of analyses indicate the extent to which the polyvinyl ester has been converted into polyvinyl formal. When the desired degree of conversion has been effected, a suitable amount of a neutralizing agent, for example, 13 parts of concentrated ammonia, is added to the reaction vessel. The neutralized mass is poured as a thin stream into water, whereupon the reaction product is precipitated in the form of threads. The thread-like material is washed with water and dried in a current of warm (60° C.) air. The dried threads are white, or nearly so. In the form of solutions, films, sheets, etc., alone or modified with addition agents, the product is useful as adhesives, as impregnating agents, in making laminated products and thermoplastic molding compositions, and for various other purposes. Resinous compositions of the kind above described decompose upon heating in air or oxygen, giving off volatile products, of which formaldehyde, formic acid and other organic acids, carbon dioxide and water have been identified. The decomposition is accompanied by a shrinkage and discoloration of the product and also, depending upon time and temperature conditions, by a partial or complete conversion of the resin to the insoluble and infusible state.

For certain applications this instability of the material is objectionable, for example in extrusion processes where the initially plastic mass may set up in the extrusion head or chamber and render the process difficult; and, also, in applications where the original light color of the material, or its transparency in film form as well as its original color, is desirable, for instance in the manufacture of laminated glass.

In accordance with the present invention the afore-described condensation product is materially stabilized against the effects of heat and oxygen by incorporating therewith a small amount, for example about 0.1 to 2.0 per cent by weight of the whole, of a substituted phenol selected from the class consisting of para-phenyl phenol, para-tertiary butyl phenol, para-tertiary amyl phenol and ortho-hydroxymethyl phenol (saligenin). The presence of such substances inhibits the decomposition of the resinous material when exposed to heat and oxygen, as evidenced, for example, by retention of its original color, solubility and fusibility to an extent not possible when the resin as normally produced is similarly exposed.

For purpose of illustration the following specific example is given:

Two grams of para-tertiary amyl phenol was dissolved in a solvent such as ethyl ether. Ninety-eight grams of the thread-like solid condensation product herein described was treated with this solution, in which it was substantially insoluble, and constantly stirred while evaporating the solvent. The resulting product, which retained its thread-like shape, was placed in a glass vessel. The vessel was then put into an oven having an air atmosphere and maintained at a temperature of about 150° C. After 20 hours' exposure the material had the same color as at the beginning of the experiment. After 35 hours' exposure the sample had assumed only a very light yellowish color, had not shrunk appreciably and was almost completely soluble in the common solvents for the material. A sample of the condensation product not treated as above described, and exposed simultaneously with the treated sample to the same conditions of heat and air, soon began to darken. After 20 hours' exposure the color had turned to brown and after 35 hours it was deep brown. A considerable shrinkage also had taken place, and the material was practically insoluble in solvents in which it originally was soluble.

The inhibitor may be incorporated, in any suitable manner, with the resin during its preparation or with the finished resin in solid or solution state. For instance, the solid inhibitor may be ground with the resin, or, as in the cited example, it may be deposited from solution state on the solid resin. Or, the inhibitor may be dissolved in a solvent and be added in solution form to the resin dissolved in the same or a different solvent. The solvent is then evaporated, leaving the inhibitor distributed throughout the resin.

What I claim as new and desire to secure by Letters Patent of the United States is:

1. The method of improving the stability against heat and oxygen of a resinous material obtained by condensing formaldehyde with a hydrolysis product of polyvinyl ester which comprises incorporating with said material a small amount of ortho-hydroxymethyl phenol.

2. The method of improving the stability against heat and oxygen of a resinous composition comprising the product of condensing formaldehyde with a product of hydrolysis of polyvinyl acetate which consists in incorporating with said composition about 0.1 to 2.0 per cent by weight of the whole of ortho-hydroxymethyl phenol.

3. A composition of matter which is resistant to discoloration under the influence of heat and oxygen and which contains as essential ingredients the resinous material obtained by condensing formaldehyde with a hydrolysis product of polyvinyl ester and, in addition thereto, a small amount of ortho-hydroxymethyl phenol.

4. An adhesive composition for bonding together laminated glass, said composition being resistant to discoloration under the influence of heat and oxygen and containing as essential ingredients the product of condensing formaldehyde with a product of hydrolysis of polyvinyl acetate and, in addition thereto, from 0.1 to 2.0 per cent by weight of the whole of ortho-hydroxymethyl phenol thereby to inhibit the decomposition and accompanying discoloration of the said resinous material when exposed to heat and oxygen.

BIRGER W. NORDLANDER.